United States Patent
Shim et al.

(10) Patent No.: US 10,936,964 B2
(45) Date of Patent: Mar. 2, 2021

(54) METHOD AND APPARATUS FOR ESTIMATING MULTI-RANKING USING PAIRWISE COMPARISON DATA

(71) Applicant: SNU R&DB FOUNDATION, Seoul (KR)

(72) Inventors: Kyu Seok Shim, Seoul (KR); Woo Yeol Kim, Seoul (KR); Young Hoon Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 946 days.

(21) Appl. No.: 15/531,920

(22) PCT Filed: Mar. 17, 2015

(86) PCT No.: PCT/KR2015/002563
§ 371 (c)(1),
(2) Date: May 31, 2017

(87) PCT Pub. No.: WO2016/088942
PCT Pub. Date: Jun. 9, 2016

(65) Prior Publication Data
US 2017/0323218 A1    Nov. 9, 2017

(30) Foreign Application Priority Data

Dec. 1, 2014 (KR) .......... 10-2014-0169861
Jan. 9, 2015 (KR) .......... 10-2015-0003408

(51) Int. Cl.
*G06N 7/00* (2006.01)
*G06N 20/00* (2019.01)
(Continued)

(52) U.S. Cl.
CPC ....... *G06N 7/005* (2013.01); *G06F 16/24578* (2019.01); *G06F 17/18* (2013.01); *G06N 20/00* (2019.01)

(58) Field of Classification Search
CPC ...... G06N 7/005; G06N 20/00; G06N 99/005; G06F 16/24578; G06F 17/18; G06F 17/00; G06F 17/3053
(Continued)

(56) References Cited

U.S. PATENT DOCUMENTS 7,403,910 B1 * 7/2008 Hastings ................ G06Q 30/02
705/26.1
7,747,547 B1 * 6/2010 Buturovic ............ G06K 9/6277
706/12
(Continued)

FOREIGN PATENT DOCUMENTS

| JP | 5143879 | B2 * | 2/2013 |
| KR | 10-1265896 | | 5/2013 |
| KR | 10-1450453 | | 10/2014 |

OTHER PUBLICATIONS

Lu et al., "Individualized Rank Aggregation using Nuclear Norm Regularization" Oct. 3, 2014, pp. 1-12. (Year: 2014).*
(Continued)

*Primary Examiner* — Miranda M Huang
*Assistant Examiner* — Chase P. Hinckley
(74) *Attorney, Agent, or Firm* — Harness, Dickey & Pierce, P.L.C.

(57) ABSTRACT

The present invention relates to a method and an apparatus for estimating multiple-ranking using pairwise comparative data, the method according to one embodiment comprising the steps of: inputting information for pairwise comparative data as input; and generating multiple-ranking data on the basis of the input data, wherein the input data comprises a collection of a plurality of respondents, a collection of a
(Continued)

| Person | Pairwise Comparison |
|---|---|
| $u_1$ | $D < C, A < D, A < C$ |
| $u_2$ | $C < D, C < B, C < A$ |
| $u_3$ | $B < A, B < D, A < D$ |
| $u_4$ | $B < C, B < D, A < B$ | plurality of items, and a collection of a plurality of pairwise comparative data for the plurality of items, and each item of pairwise comparative data in the plurality of same is data indicating the preference between two items determined in accordance with an evaluation criterion from among a plurality of evaluation criteria.

9 Claims, 6 Drawing Sheets

(51) Int. Cl.
  *G06F 16/2457* (2019.01)
  *G06F 17/18* (2006.01)
(58) Field of Classification Search
  USPC .......................................................... 706/52
  See application file for complete search history.

(56) References Cited

U.S. PATENT DOCUMENTS

| | | | | |
|---|---|---|---|---|
| 7,890,362 | B2* | 2/2011 | Flores | G06Q 10/063 |
| | | | | 705/7.32 |
| 8,589,319 | B2* | 11/2013 | Balakrishnan | G06N 7/005 |
| | | | | 706/14 |
| 8,825,640 | B2* | 9/2014 | Cormode | G06F 16/20 |
| | | | | 707/723 |
| 9,092,516 | B2* | 7/2015 | Ilyas | G06F 16/9535 |
| 9,129,227 | B1* | 9/2015 | Yee | G06F 16/24578 |
| 9,251,527 | B2* | 2/2016 | Shah | G06Q 30/0204 |
| 9,582,760 | B2* | 2/2017 | Bilal | G06F 19/34 |
| 9,672,364 | B2* | 6/2017 | Zhang | G06F 17/18 |
| 9,679,247 | B2* | 6/2017 | Koutra | G06N 5/022 |
| 9,727,653 | B2* | 8/2017 | Lu | G06N 7/005 |
| 9,954,942 | B2* | 4/2018 | Dey | G06Q 20/102 |
| 9,984,387 | B2* | 5/2018 | Moran | G06Q 30/0244 |
| 10,318,984 | B1* | 6/2019 | Wai | G06Q 30/0255 |
| 10,346,453 | B2* | 7/2019 | Burges | G06F 16/3326 |
| 10,545,938 | B2* | 1/2020 | Hardas | G06Q 30/0203 |
| 2007/0203872 | A1* | 8/2007 | Flinn | G06N 7/02 |
| | | | | 706/62 |
| 2008/0222062 | A1* | 9/2008 | Liu | G06N 7/005 |
| | | | | 706/15 |
| 2010/0235362 | A1* | 9/2010 | Cormode | G06F 16/24578 |
| | | | | 707/748 |
| 2012/0143790 | A1* | 6/2012 | Wang | G06F 16/951 |
| | | | | 706/12 |
| 2012/0143802 | A1* | 6/2012 | Balakrishnan | G06N 7/005 |
| | | | | 706/14 |
| 2012/0303615 | A1* | 11/2012 | Goswami | G06N 5/048 |
| | | | | 707/723 |
| 2013/0054616 | A1* | 2/2013 | Ammar | G06F 16/9535 |
| | | | | 707/748 |
| 2013/0124449 | A1* | 5/2013 | Pinckney | G06N 5/045 |
| | | | | 706/52 |
| 2013/0198205 | A1* | 8/2013 | Zaman | G06F 16/9535 |
| | | | | 707/748 |
| 2014/0040176 | A1* | 2/2014 | Balakrishnan | G06N 7/005 |
| | | | | 706/14 |
| 2015/0269156 | A1* | 9/2015 | Awadallah | G06F 16/24578 |
| | | | | 707/732 |
| 2015/0347591 | A1* | 12/2015 | Bax | G06Q 30/0269 |
| | | | | 707/749 |
| 2015/0370837 | A1* | 12/2015 | Branson | G06F 16/24578 |
| | | | | 707/748 |
| 2015/0379012 | A1* | 12/2015 | Awadallah | G06F 16/24578 |
| | | | | 707/706 |
| 2015/0379016 | A1* | 12/2015 | Eriksson | G06F 16/9024 |
| | | | | 707/724 |
| 2015/0379411 | A1* | 12/2015 | Kapoor | G06N 7/005 |
| | | | | 706/14 |
| 2017/0308594 | A1* | 10/2017 | Hong | G06F 16/25 |
| 2017/0316448 | A1* | 11/2017 | Montero | G06Q 30/0201 |

OTHER PUBLICATIONS

Negahban et al., "Rank Centrality: Ranking from Pair-wise Comparisons" Jan. 3, 2014, pp. 1-39. (Year: 2014).*
Lu et al., "Effective Sampling and Learning for Mallows Models with Pairwise-Preference Data" Jan. 2014, pp. 1-47. (Year: 2014).*
Rajkumar et al., "A Statistical Convergence Perspective of Algorithms for Rank Aggregation from Pairwise Data" Jan. 27, 2014, Proceedings of the 31st International Conference on Machine Learning. (Year: 2014).*
Sugiyama et al., "Superfast-Trainable Multi-Class Probabilistic Classifier by Least Squares Posterior Fitting" Jun. 26, 2011, pp. 1-19. (Year: 2011).*
Busa-Fekete et al., "Preference-Based Rank Elicitation using Statistical Models: The Case of Mallows" Jun. 2014, Proceedings of the 31st Annual Conference on Machine Learning. (Year: 2014).*
De Pessemier et al., "Comparison of group recommendation algorithms" Jun. 30, 2013, pp. 2497-2541. (Year: 2013).*
Osting et al., "Enhanced statistical rankings via targeted data collection" 2013, Proceedings of the 30th International Conference on Machine Learning. (Year: 2013).*
Uematsu et al., "Statistical Optimality in Multipartite Ranking and Ordinal Regression" Aug. 2013, pp. i-33. (Year: 2013).*
Yaraghi et al., "Comparison of AHP and Monte Carlo AHP Under Different Levels of Uncertainty" Oct. 9, 2014, IEEE Transactions on Engineering Management, pp. 122-132. (Year: 2014).*
Wauthier et al., "Efficient Ranking from Pairwise Comparisons" 2013, Proceedings of the 30th International Conference on Machine Learning. (Year: 2013).*
Wang et al., "Active Collaboration Permutation Learning" Aug. 24-27, 2014, pp. 502-511. (Year: 2014).*
Cheng, Weiwei "Label Ranking with Probabilistic Models" Mar. 2012, Doctoral Dissertation, Philipps-University Marburg, pp. i-105. (Year: 2012).*
Furnkranz et al., "Binary Decomposition Methods for Multipartite Ranking" 2009. (Year: 2009).*
Jin et al., "Combination of Multiple Bipartite Ranking for Web Content Quality Evaluation" Jun. 26, 2014, pp. 1-17. (Year: 2014).*
Zhou et al., "A Taxonomy of Label Ranking Algorithms" Mar. 2014, Journal of Computers, vol. 9, No. 3, pp. 557-565. (Year: 2014).*
Zong et al., "Learning to Rank with Extreme Learning Machine" Mar. 23, 2013, pp. 155-166. (Year: 2013).*
Hajek et al., "Minimax-optimal Inference from Partial Rankings" 2014, pp. 1-9. (Year: 2014).*
Xu et al., "Fast Adaptive Algorithm for Robust Evaluation of Quality of Experience" Oct. 22, 2014, pp. 1-13. (Year: 2014).*
Tran et al., "Permutation Models for Collaborative Ranking" Jul. 23, 2014, pp. 1-12. (Year: 2014).*
Duchi et al., "The Asymptotics of Ranking Algorithms" Nov. 26, 2013, pp. 1-54. (Year: 2013).*
Fogel et al., "Spectral Ranking Using Seriation" Jun. 20, 2014, pp. 1-15. (Year: 2014).*
Meila et al., "Consensus ranking under the exponential model" 2012, pp. 285-294. (Year: 2012).*
Wang et al., "Online Learning with Pairwise Loss Functions" Jan. 22, 2013, pp. 1-37. (Year: 2013).*
Kar et al., "On the Generalization Ability of Online Learning Algorithms for Pairwise Loss Functions" May 11, 2013. (Year: 2013).*
He et al., "Cross-Modal Learning via Pairwise Constraints" Nov. 28, 2014, pp. 1-12. (Year: 2014).*
Chari et al., "On Pairwise Cost for Multi-Object Network Flow Tracking" Aug. 14, 2014, pp. 1-10. (Year: 2014).*
Shah et al., "Stochastically Transitive Models for Pairwise Comparisons: Statistical and Computational Issues" Oct. 21, 2015, pp. 1-41. (Year: 2015).*
Ding et al., "Learning Mixed Membership Mallows Models from pairwise comparisons" Apr. 3, 2015. (Year: 2015).*
Park et al., "Preference Completion: Large-scale Collaborative Ranking from Pairwise Comparisons" Jul. 16, 2015, pp. 1-23. (Year: 2015).*
Chen et Suh, "Spectral MLE: Top-K Rank Aggregation from Pairwise Comparisons" May 28, 2015, pp. 1-34. (Year: 2015).*

(56) References Cited

OTHER PUBLICATIONS

International Search Report from corresponding PCT Application No. PCT/KR2015/002563 dated Aug. 28, 2015, with English translation.

Negahban, Sahand et al., Iterative Ranking from Pair-wise Comparisons, Advances in Neural Information Processing Systems 25 (NIPS 2012).

Korean Office Action from corresponding Korean Application No. 10-2015-0003408 dated Oct. 27, 2015, with English translation.

* cited by examiner $B < A$
$A < B$
$B < C$
$C < D$
$B < D$

| Hotel | Rate | Distance |
|-------|------|----------|
| A | $200 | 4Km |
| B | $400 | 2Km |
| C | $700 | 1Km |
| D | $600 | 5Km |

(a)

(b)

| Person | Pairwise Comparison |
|--------|---------------------|
| $u_1$ | $D < C, A < D, A < C$ |
| $u_2$ | $C < D, C < B, C < A$ |
| $u_3$ | $B < A, B < D, A < D$ |
| $u_4$ | $B < C, B < D, A < B$ |

Evaluation Criterion Preference Probability Distribution ($\theta_{u,m}$)

| Criteria \ Respondent | $u_1$ | $u_2$ | $u_3$ | .... | $u_L$ |
|---|---|---|---|---|---|
| $m_1$ | 0.15 | 0.10 | 0.24 | .... | 0.08 |
| $m_2$ | 0.10 | 0.13 | 0.21 | .... | 0.14 |
| $m_3$ | 0.23 | 0.17 | 0.03 | .... | 0.26 |
| ⋮ | | | | .... | ⋮ |
| $m_d$ | 0.05 | 0.25 | 0.09 | .... | 0.18 |
| Total | 1 | 1 | 1 | .... | 1 |

FIG. 6A

Item Scores ($\pi_i(m)$)

| Criteria \ Item | $o_1$ | $o_2$ | $o_3$ | .... | $o_M$ |
|---|---|---|---|---|---|
| $m_1$ | 2.7 | 1.2 | 3.7 | .... | 3.2 |
| $m_2$ | 3.6 | 1.8 | 2.1 | .... | 3.1 |
| $m_3$ | 4.4 | 1.6 | 1.8 | .... | 3.5 |
| ⋮ | | | | .... | ⋮ |
| $m_d$ | 4.1 | 2.2 | 3.6 | .... | 2.9 |

FIG. 6B

METHOD AND APPARATUS FOR ESTIMATING MULTI-RANKING USING PAIRWISE COMPARISON DATA

CROSS-REFERENCE TO RELATED APPLICATIONS

This application is a national phase application of PCT Application No. PCT/KR2015/002563, filed on Mar. 17, 2015, which claims the benefit and priority to Korean Patent Application No. 10-2015-0003408, filed Jan. 9, 2015 and Korean Patent Application No. 10-2014-0169861, filed Dec. 1, 2014. The entire disclosures of the applications identified in this paragraph are incorporated herein by references.

FIELD

The present invention relates to a method and an apparatus for estimating rankings, and more particularly, to a method and an apparatus for estimating multi-ranking using pairwise comparison.

BACKGROUND ART

Ranking learning refers to a method which learns a ranking model using a collection of given items and learning data, and finds rankings (preference) of items using the result of learning. In recent years, this method is widely used in information retrieval and recommendation systems to find the most relevant document to a given document.

There are many kinds of learning data to use in ranking learning, and there is a ranking learning method which utilizes a result of 'pairwise comparison' (comparison of rankings between two items) from among the learning data. For example, it is assumed that four items (A, B, C, and D) are given and five results of pairwise comparison are given as shown in FIG. 1. "B<A" means that B is higher than A in the rankings. In this case, the number of methods for determining a ranking order for all items is 24 (4!=24). It may be determined which rankings are accurate by determining how well the 24 methods reflect the results of the pairwise comparison as an evaluation criterion. In the case of FIG. 1, since two ranking orders B<A<C<D and A<B<C<D best reflect the five results of the pairwise comparison of FIG. 1, one of the two ranking orders may be used as a real ranking.

In the case of the above-described ranking learning, it is assumed that the rankings of all items are determined according to a single evaluation criterion. However, a multiple ranking problem estimates that rankings of all items are different according to a plurality of evaluation criteria (known as "dimensions"), and aims at acquiring all rankings according to the respective evaluation criteria.

For example, it is assumed that room rates of hotels and distances to the center of a city are given as shown in FIG. 2. In this example, evaluation criteria (dimensions) are room rates and distances. On the assumption that, as the room rate is lower, the ranking is higher, and, as the distance is shorter, the ranking is higher, the rankings of the hotels regarding the room rates are A<B<D<C and the rankings of the hotels regarding the distances are C<B<A<D.

In the above-described example, the evaluation criteria, "room rates" and "distances," are already known. However, in the real multiple ranking problem, rankings may be determined based on all potential evaluation criteria using given pairwise comparison results without knowing what evaluation criterion is adopted to conduct each pairwise comparison. The multiple ranking problem is more practical than an existing single ranking learning problem in that real pairwise comparison is mostly conducted by people and people determine rankings between items based on a specific evaluation criterion according to their respective personal tastes.

For example, it is assumed that, when the list of FIG. 2 is provided, result data of pairwise comparison as shown in FIG. 3 is obtained from four respondents ($u_1$ to $u_4$). In this case, it is not known what evaluation criterion is used for each respondent to conduct pairwise comparison, and it is only assumed that the results of the pairwise comparison as shown in FIG. 3 are given. Referring to the result data of the pairwise comparison of FIG. 3, it can be seen that the response of the respondent $u_1$ and the response of the respondent $u_2$ are greatly different from each other. It may be estimated that this is because the respondent $u_1$ conducted pairwise comparison based on room rates, and the respondent $u_2$ conducted pairwise comparison based on distances. Since there may be many conflicting pairwise comparison results when result data of pairwise comparison is given, it is difficult to obtain an accurate ranking by using existing single ranking learning. An existing algorithm for inferring rankings between items using pairwise comparison results is useful when it has an only one-dimensional value, but, when it is applied to a recommendation system, real users determine rankings according to various evaluation criteria and thus it is difficult to obtain accurate results.

DETAILED DESCRIPTION OF THE PRESENT DISCLOSURE

Technical Objects

According to one exemplary embodiment of the present invention, there is provided a method and an apparatus for estimating multi-ranking, which can estimate rankings of items according to a plurality of evaluation criteria when there exist the plurality of evaluation criteria in given pairwise comparison results.

According to one exemplary embodiment of the present invention, there is provided a method and an apparatus for multi-ranking, which can estimate preference of each user regarding a plurality of ranking evaluation criteria by calculating an evaluation criterion preference probability distribution based on result data of pairwise comparison.

Technical Solving Means

According to one exemplary embodiment of the present invention, there is provided a method for estimating multi-ranking using pairwise comparison data, the method including: inputting information on pairwise comparison data as input data; generating multi-ranking data based on the input data, wherein the input data includes a collection of a plurality of respondents, a collection of a plurality of items, and a collection of a plurality of pairwise comparison data regarding the plurality of items, and wherein each of the plurality of pairwise comparison data is data indicating preference between two items determined according to one of a plurality of evaluation criteria. According to one exemplary embodiment of the present invention, there is provided a computer readable recording medium which has a program recorded thereon, for executing the multi-ranking estimation method in a computer.

Advantageous Effect

According to one exemplary embodiment of the present invention, when there are a plurality of evaluation criteria in a given pairwise comparison result, ranking of an item may be estimated according to the plurality of evaluation criteria, and furthermore, there is an advantage that the characteristic of each of the plurality of evaluation criteria can be analyzed and provided.

According to one embodiment of the present invention, there is an advantage that, by calculating an evaluation criterion preference probability distribution based on result data of pairwise comparison, preference of each user regarding the plurality of evaluation criteria can be estimated.

In addition, since respondents do not always give correct pairwise comparison results due to an error or mistake, there may be inaccuracy in the result data of the pairwise comparison. According to one embodiment of the present invention, there is an advantage that, regarding a pairwise comparison result including such inaccuracy, rankings of items can be correctly estimated according to a plurality of evaluation criteria.

DESCRIPTION OF THE DRAWINGS

FIG. 6A is a view to illustrate an evaluation criterion preference probability distribution according to one embodiment;

FIG. 6B is a view to illustrate item scores according to one embodiment;

BEST MODE FOR EMBODYING THE INVENTION

Exemplary embodiments will now be described more fully with reference to the accompanying drawings to clarify object, other objects, features and advantages of the present invention. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

If the terms such as "first" and "second" are used to describe elements, these elements should not be limited by such terms. These terms are used for the purpose of distinguishing one element from another element only. The exemplary embodiments include their complementary embodiments.

As used herein, the singular forms are intended to include the plural forms as well, unless the context clearly indicates otherwise. It will be further understood that the terms "comprises" and/or "comprising," when used in this specification, do not preclude the presence or addition of one or more other components.

Hereinafter, the present invention will be described in greater detail with reference to the accompanying drawings. In the following description of specific embodiments, various specific features are provided to assist in a comprehensive understanding of the present invention. However, it is apparent that the exemplary embodiments can be carried out by those of ordinary skill in the art without those specifically defined features. In the description of the exemplary embodiment, certain detailed explanations of related art are omitted when it is deemed that they may unnecessarily obscure the essence of the present invention.

The present invention models, as a probability model, a process of respondents responding to pairwise comparison between two items. In one embodiment, multi-ranking data used in modeling this probability model may include a probability that people give a correct answer for each evaluation criterion, a weight of an evaluation criterion preferred by each person, and ranking score values of real items according to each evaluation criterion. In one embodiment, a likelihood function indicating a probability that real results of pairwise comparison are obtained according to such a multi-ranking data value may be obtained. Multi-ranking data for maximizing the likelihood function value may be calculated by using an expectation-maximization (EM) algorithm, and rankings of the items for each evaluation criterion are calculated based on the ranking scores of the items according to each evaluation criterion, which is one of the multi-ranking data.

Figures 1, 2, 3:
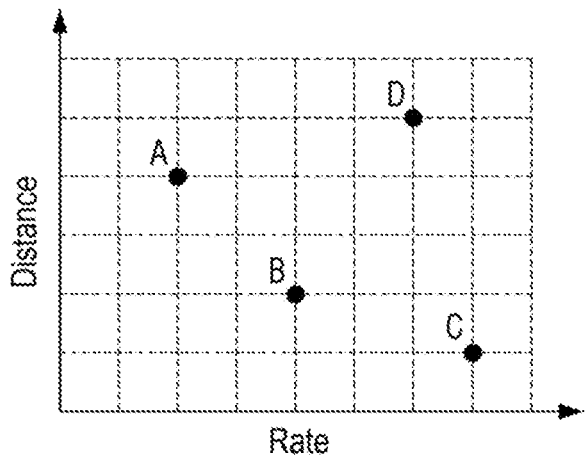
FIGS. 1, 2, and 3 are views to illustrate a related-art ranking learning method.
Figure 4:
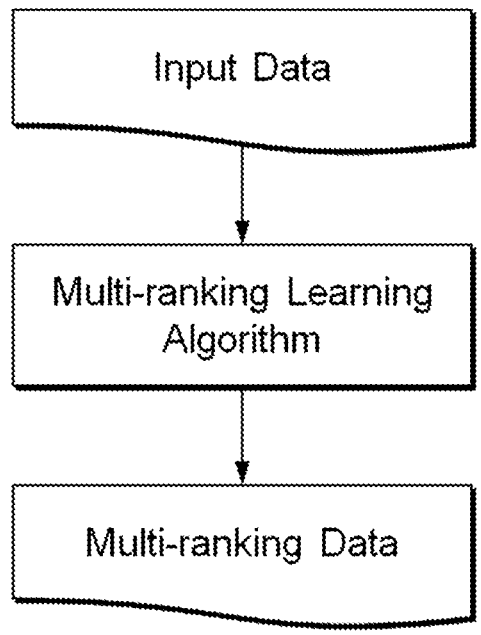
FIG. 4 is a flowchart to illustrate a method for estimating multi-ranking using pairwise comparison data according to one embodiment of the present invention.

FIG. 4 is a flowchart to illustrate a method for estimating multi-ranking using pairwise comparison data according to one embodiment of the present invention.

The method for estimating the multi-ranking using the pairwise comparison data according to one embodiment includes a step of inputting information regarding pairwise comparison data to a multi-ranking learning algorithm as input data, and a step of generating, by the multi-ranking learning algorithm, multi-ranking data based on the input data.

The input data inputted to the multi-ranking learning algorithm may include, for example, a collection of a plurality of respondents, a collection of a plurality of items, and a collection of a plurality of pairwise comparison data regarding the plurality of items. Each of the plurality of pairwise comparison data is data indicating preference between two items determined according to a certain evaluation criterion from among the plurality of evaluation criteria.

The multi-ranking data generated by the multi-ranking learning algorithm may include, for example, a probability distribution of a probability that a respondent prefers a certain evaluation criterion ("evaluation criterion preference probability distribution"), a ranking score of each item according to each evaluation criterion ("item score"), and a probability distribution of a probability that a respondent correctly responds according to each evaluation criterion ("response accuracy probability distribution"). The result of ranking between items for each evaluation criterion may be derived according to item scores which are generated in the multi-ranking learning algorithm.

Figure 5:
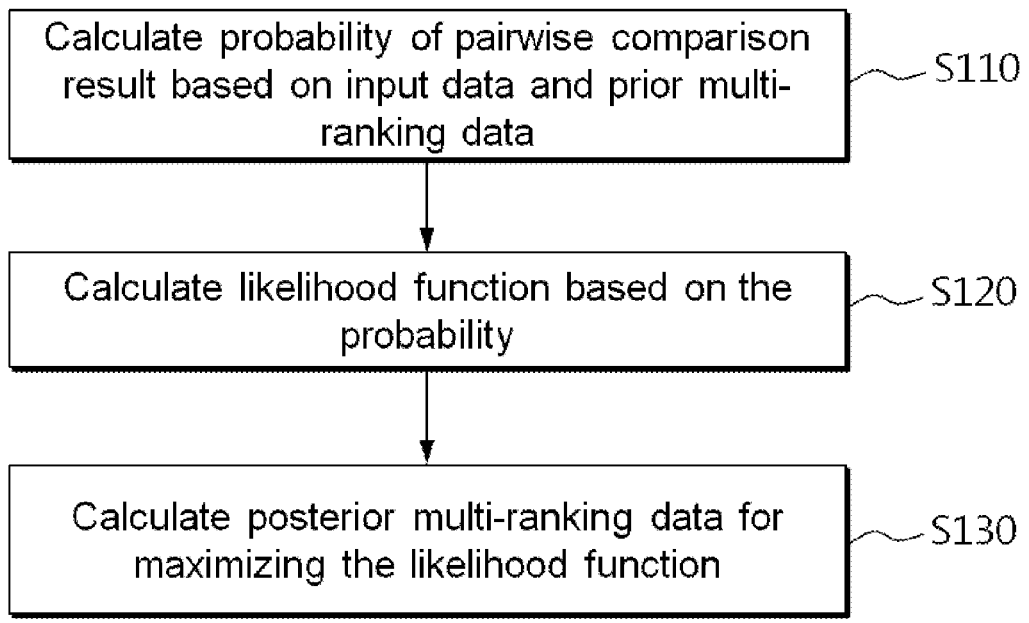
FIG. 5 is a flowchart showing an exemplary method of a multi-ranking learning algorithm of FIG. 4.

Hereinafter, one embodiment of an exemplary learning method according to a multi-ranking learning algorithm will be described with reference to FIGS. 5 and 6. FIG. 5 is a flowchart showing an exemplary method of the multi-ranking learning algorithm of FIG. 4.

Referring to the drawing, the method of generating multi-ranking data using the multi-ranking learning algorithm may include a step (S110) of calculating a probability of a pairwise comparison result between two certain items based on input data and prior multi-ranking data, a step (S120) of calculating a likelihood function based on the probability, and a step of (S130) of calculating posterior multi-ranking data for maximizing the likelihood function.

In step S110, the probability of the pairwise comparison result is calculated using the input data and the prior multi-ranking data. The prior multi-ranking data used at this time includes a prior evaluation criterion preference probability distribution, a prior item score, and a prior response accuracy probability distribution. The prior multi-ranking data may be an arbitrarily set estimation value or may be a value which is not calculated based on real input data. The multi-ranking data used in step S110 may be an estimation probability distribution and an estimation item score, and posterior multi-ranking data (that is, a posterior evaluation criterion preference probability distribution, a posterior item score, and a posterior response accuracy probability distribution) that satisfies real input data are obtained through steps S120 and S130.

The present invention according to one preferred embodiment uses Bayes' Theorem which derives posterior probability information using a prior probability and an observed value (that is, input data), and obtains a posterior probability distribution and a posterior item score of multi-ranking data using a prior probability distribution (for example, an "evaluation criterion preference probability distribution" and a "response accuracy probability distribution"), and a prior item score and an observed value (for example, "input data") of multi-ranking data.

Input Data

In step S110, the probability of the results of the pairwise comparison is calculated using the input data and the prior multi-ranking data. Herein, the "input data" is data which is necessary for generating the posterior multi-ranking data, and is a known value which is already collected or determined. The input data may include a collection of a plurality of respondents (U), a collection of a plurality of items (O), and a collection of a plurality of pairwise comparison data ($C_u$) regarding the plurality of items as follows:

U={$u_1, \ldots, u_L$}: A collection of respondents who conduct pairwise comparisons. Each of the respondents is expressed by "u" on the assumption that a number L of the respondents (L is an integer greater than or equal to 2) conduct pairwise comparisons.

O={$o_1, \ldots, o_M$}: A collection of items which are objects of pairwise comparison. The items are expressed by "$o_i$," "$o_j$," and so on, on the assumption that a number M of items (M is an integer greater than or equal to 2) exist. A pairwise comparison result indicating that the item ($o_i$) has a higher priority than that of the item ($o_j$) in pairwise comparison is expressed by "$o_i < o_j$."

$C_u$: A collection of all pairwise comparisons made by each respondent u.

Multi-Ranking Data

The multi-ranking data refers to prior data which is inputted to the multi-ranking algorithm, or posterior data which is generated as a result of calculating by the multi-ranking algorithm. The multi-ranking data may include an evaluation criterion preference probability distribution ($\theta_{u,m}$), an item score ($\pi_i(m)$), and a response accuracy probability distribution ($\eta_m$) as follows.

The evaluation criterion preference probability distribution ($\theta_{u,m}$) refers to a probability distribution of a probability that a respondent selects a certain evaluation criterion.

The item score ($\pi_i(m)$) refers to a score of each item according to each evaluation criterion. That is, the item score means a score which is given to each item by a respondent according to each evaluation criterion.

The response accuracy probability distribution ($\eta_m$) refers to a probability distribution of a probability when a respondent correctly responds according to each evaluation criterion.

Figures 6C, 7:
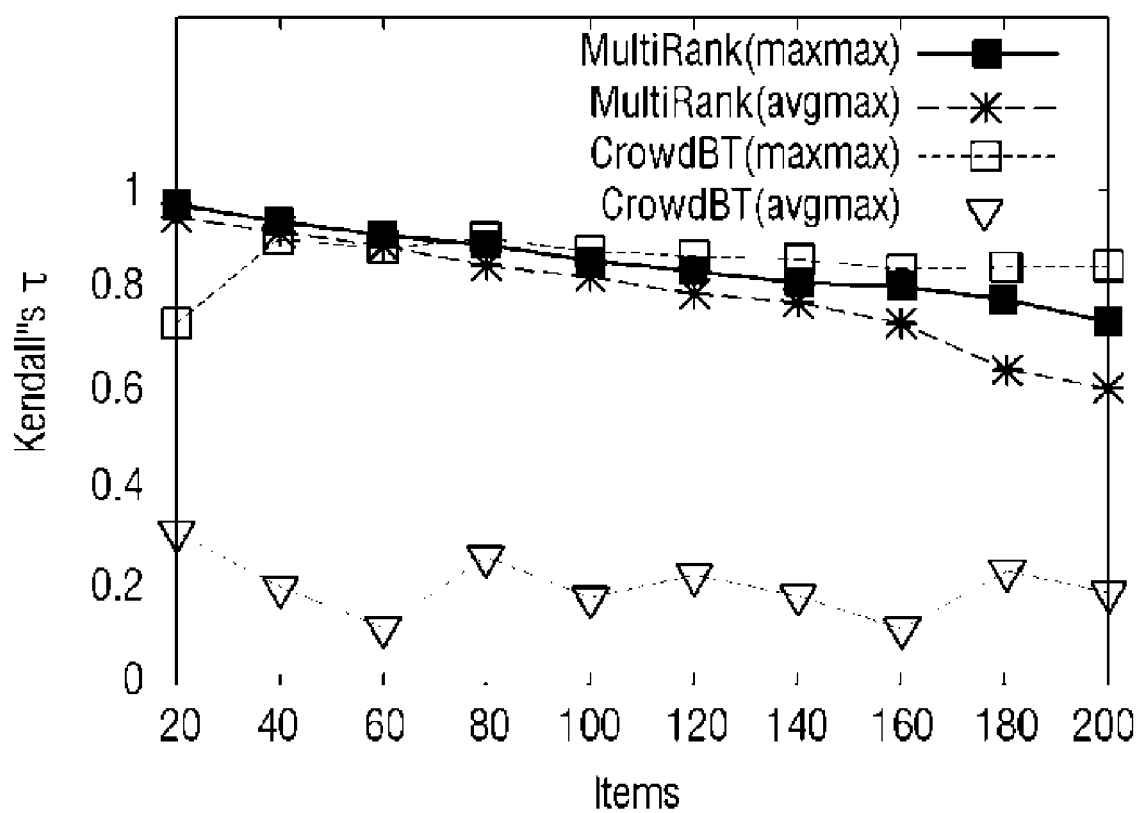
FIG. 6C is a view to illustrate a response accuracy probability distribution according to one embodiment.
FIGS. 7, 8, 9, and 10 are views to illustrate results of an experiment of a multi-ranking estimation method according to one embodiment.

In this regard, FIGS. 6a to 6c show example values of the evaluation criterion preference probability distribution, the item score, and the response accuracy probability distribution for easy understanding.

FIG. 6a shows the evaluation criterion preference probability distribution ($\theta_{u,m}$) according to one embodiment, and indicates a probability that a specific evaluation criterion (m) is selected by each respondent when the number of respondents (u) is L and the number of evaluation criteria (m) is d. Referring to the table, a probability that a respondent $u_1$ prefers an evaluation criterion $m_1$ and selects this evaluation criterion $m_1$ for pairwise comparison is 0.15, and a probability that the respondent $u_1$ prefers and selects an evaluation criterion $m_2$ is 0.10. In this way, a probability that the respondent $u_1$ prefers each of the evaluation criteria ($m_1$ to $m_d$) is displayed, and the sum of the probabilities of the preference of the respondent $u_1$ regarding all of the evaluation criteria is 1. Likewise, probabilities that the respondent $u_2$ to the respondent $u_L$ prefer evaluation criteria are displayed, and it can be seen that the sum of the probabilities of the preference of each respondent regarding all evaluation criteria is 1.

Since the evaluation criterion preference probability distribution indicates a probability that each respondent (u) prefers one of the d number of different evaluation criteria, this probability distribution may be expressed by a d-dimensional vector, that is, $\vec{\theta}_u = [\theta_{u,1}, \ldots \theta_{u,d}]$, and hereinafter, the evaluation criterion preference probability distribution of a certain respondent (u) regarding a certain evaluation criterion (m) will be expressed by $\theta_{u,m}$.

In step S110, the prior evaluation criterion preference probability distribution ($\theta_{u,m}$) inputted to the multi-ranking algorithm may have a value which is already set or estimated. In one embodiment, it may be assumed that this prior evaluation criterion preference probability distribution follows a certain probability distribution. In embodiments which will be described below, it is assumed that the prior evaluation criterion preference probability distribution follows a Dirichlet distribution, for example. That is, it is assumed that the vector 9 follows the Dirichlet distribution (Dir ($\alpha$)), and herein, $\alpha=[\alpha_1, \ldots, \alpha_d]$ and $\alpha$ is a pre-given factor.

FIG. 6b shows the item score ($\pi_i(m)$) according to one embodiment, and indicates a score which is obtained by each item when the number of item (o) is M and the number of evaluation criteria (m) is d. Referring to the table, each item (o) has scores according to d number of different evaluation criteria (m), and for example, the score may be expressed by a certain real number from 0 to 10. In this case, it is assumed that, as the score is lower, the priority is higher.

However, since the pairwise comparison indicates a relative preference between two items, the item score does not necessarily have a value of a specific range (for example, from 0 to 10), and in an alternative embodiment, item scores may have values between 1 and 5. In addition, in an alternative embodiment, it may be assumed that as the score is higher, the corresponding item is more preferred.

Hereinafter, a score value of a certain item ($o_i$) according to an m-th evaluation criterion is expressed by $\pi_i(m)$. Mathematically, the scores of the corresponding item according to all evaluation criteria may be expressed by a d-dimensional vector, that is, $\langle \pi_i(1), \ldots \pi_p(d) \rangle \in R^d$. In addition, a vector collecting score values of all items according to the m-th evaluation criterion may be expressed by $\vec{\pi}(m) = \langle \pi_i(m) \ldots \pi_M(m) \rangle$.

FIG. 6c shows the response accuracy probability distribution ($\eta_m$) according to one embodiment, and indicates a probability that a respondent correctly conducts pairwise comparison according to each evaluation criterion, as the respondent originally intended, when the number of evaluation criteria (m) is d. Hereinafter, a probability that a respondent correctly responds according to an m-th evaluation criterion, that is, a response accuracy probability, will be expressed by $\eta_m$.

In step S110, the prior response accuracy probability distribution ($\eta_m$) inputted to the multi-ranking algorithm may have a value which is already set or estimated. In one embodiment, it may be assumed that the prior response accuracy probability distribution follows a certain probability distribution, and in the following embodiments, it is assumed that the prior response accuracy probability distribution follows a beta distribution, for example. Herein, $\beta = [\beta_1, \beta_2]$ and $\beta$ is an already-given factor like $\alpha$.

Calculating Probability of Pairwise Comparison Result

Referring back to FIG. 5, in step S110, the probability of the pairwise comparison result $Pr_u(o_i \prec o_j)$ is calculated using the input data and the prior multi-ranking data described above. Herein, the probability ($Pr_u(o_i \prec o_j)$) refers to a probability of a result of comparison indicating that a certain respondent (u) prefers a certain first item ($o_i$) to a certain second item ($o_j$).

It is thought that the processes of producing respective pairwise comparisons are independent from one another. When it is assumed that a plurality of pairwise comparison queries are given to the respondent (u), the probability ($Pr_u(o_i \prec o_j)$) when pairwise comparison between two items $o_i$ and $o_j$ is asked as a t-th query may be expressed by Equation 1 presented below.

$$Pr_u(o_i \prec o_j) = \sum_{m=1}^{d} Pr_u(o_i \prec o_j \wedge s_{u,t} = m) \quad \text{Equation 1}$$
$$= \sum_{m=1}^{d} Pr_u(o_i \prec o_j \mid s_{u,t} = m) \cdot Pr_u(s_{u,t} = m)$$

Herein, $Pr_u(s_{u,t} = m)$ is a probability that a respondent (u) compares two items using an evaluation criterion (m). This may be determined by selecting a certain evaluation criterion (m) using a multinomial distribution Multinomial ($\vec{\theta}_u$) according to $\vec{\theta}_u$. Herein, $s_{u,t}$ is a variable indicating which evaluation criterion among the total d number of evaluation criteria is selected, and is a certain integer between 1 and d. For example, $Pr_u(s_{u,t} = 1)$ is a probability that pairwise comparison between two items is conducted using the first evaluation criterion ($m_1$). A probability that a certain evaluation criterion (m) is selected, that is, $Pr_u(s_{u,t} = m)$, is an evaluation criterion preference probability distribution ($\theta_{u,m}$) according to a definition of the multinomial distribution.

In Equation 1, $Pr_u(o_i \prec o_j \mid s_{u,t} = m)$ is expressed as follows when it is considered whether there is an error in a comparing process of a respondent (u).

$$Pr_u(o_i < o_j \mid s_{u,t} = m) = Pr_u(o_i < o_j, p_{u,t} = 1 \mid s_{u,t} = m) + \quad \text{Equation 2}$$
$$Pr_u(o_i < o_j, p_{u,t} = 0 \mid s_{u,t} = m)$$
$$= Pr_u(o_i < o_j \mid, p_{u,t} = 1, s_{u,t} = m) \cdot$$
$$Pr_u(p_{u,t} = 1 \mid s_{u,t} = m) +$$
$$Pr_u(o_i < o_j \mid p_{u,t} = 0, s_{u,t} = m) \cdot$$
$$Pr_u(p_{u,t} = 0 \mid s_{u,t} = m)$$

In Equation 2, $p_{u,t}$ is a variable indicating whether a respondent (u) has an error in the process of pairwise comparison, and is assumed to have a value 1 or 0 according to a binomial distribution Binomial ($\eta_m$) according to $\eta_m$. If $p_{u,t} = 1$, it means that a respondent gives a correct pairwise comparison result, and, if $p_{u,t} = 0$, it means that a respondent gives the opposite result in error.

Therefore, $Pr_u(p_{u,t} = 1 \mid s_{u,t} = m)$ is a probability that a certain evaluation criterion (m) is selected and a respondent (u) correctly responds according to this evaluation criterion, and corresponds to the response accuracy probability distribution ($\eta_m$), and $Pr_u(p_{u,t} = 0 \mid s_{u,t} = m)$ is a probability that a certain evaluation criterion (m) is selected and a respondent (u) oppositely responds in error according to this evaluation criterion, and may be expressed by $(1 - \eta_m)$. That is, following Equations may be established:

$$Pr_u(p_{u,t}=1 \mid s_{u,t}=m) = \eta_m \quad \text{Equation 3}$$

$$Pr_u(p_{u,t}=0 \mid s_{u,t}=m) = 1 - \eta_m \quad \text{Equation 4}$$

In addition, in Equation 2, $Pr_u(o_i \prec o_j \mid p_{u,t} = 1, s_{u,t} = m)$ is a probability of a comparison result indicating that a respondent prefers the first item ($o_i$) to the second item ($o_j$) when the respondent correctly responds.

$Pr_u(o_i \prec o_j \mid p_{u,t} = 0, s_{u,t} = m)$ is a probability of a comparison result indicating that a respondent prefers the second item ($o_j$) to the first item ($o_i$) when the respondent incorrectly responds in error.

The probability of the result of the comparison that the first item ($o_i$) is preferred to the second item ($o_j$), and the probability of the result of the comparison that the second item ($o_j$) is preferred to the first item ($o_i$) may be expressed by a certain mathematical model. In the following embodiments, it is assumed that these probabilities of results of comparison follow the Bradley-Terry model.

The Bradley-Terry model is a model which was suggested to explain preference of a respondent between two items. This model postulates that each item ($o_i$) has a certain score ($\pi_i$), and, as this score is lower, a probability that respondents prefer the corresponding item is higher. According to this model, a probability that a respondent prefers $o_i$ to $o_j$ when two items ($o_i$, $o_j$) are given, that is, a probability that a pairwise comparison result $o_i \prec o_j$ is obtained, may be expressed by the following Equation:

$$Pr_u[o_i < o_j] = \frac{e^{\pi_j}}{e^{\pi_j} + e^{\pi_i}} = \frac{e^{\pi_j - \pi_i}}{1 + e^{\pi_j - \pi_i}} \quad \text{Equation 5}$$

Accordingly, the probability of the result of comparison indicating that the respondent prefers the first item ($o_i$) to the second item ($o_j$) when the respondent correctly responds, that is, $Pr_u(o_i \prec o_j \mid p_{u,t} = 1, s_{u,t} = m)$, is as follows:

$$Pr_u(o_i < o_j \mid p_{u,t} = 1, s_{u,t} = m) = \frac{e^{\pi_j(m) - \pi_i(m)}}{1 + e^{\pi_j(m) - \pi_i(m)}} \quad \text{Equation 6}$$

In addition, the probability of the result of comparison indicating that the respondent prefers the second item ($o_j$) to the first item ($o_i$) when the respondent incorrectly responds in error, that is, $Pr_u(o_i<o_j|p_{u,t}=0, s_{u,t}=m)$, is as follows:

$$Pr_u(o_i < o_j \mid p_{u,t} = 0, s_{u,t} = m) = \frac{1}{1 + e^{\pi_j(m) - \pi_i(m)}} \quad \text{Equation 7}$$

When Equations 2 to 4, Equation 6, and Equation 7 are substituted into Equation 1 and the above-described process is performed with respect to all item pairs for which the respondent (u) is asked, the probability ($Pr_u$) of the pairwise comparison result for the respondent (u) in step S110 may be expressed as follows:

$$Pr_u(o_i \prec o_j) = \quad \text{Equation 8}$$
$$\sum_{m=1}^{d} \theta_{u,m} \left[ \eta_m \frac{e^{\pi_j(m)-\pi_i(m)}}{1+e^{\pi_j(m)-\pi_i(m)}} + (1-\eta_m)\frac{1}{1+e^{\pi_j(m)-\pi_i(m)}} \right]$$

Calculating Likelihood Function

Referring to FIG. 5, after the probability of the pairwise comparison result is calculated in step S110 as described above, the likelihood function is calculated based on this probability in step (S120).

In one embodiment, when the evaluation criterion preference probability distribution ($\theta_{u,m}$), the item score ($\pi_i(m)$), and the response accuracy probability distribution ($\eta_m$) are given as the multi-ranking data, the likelihood function (L) may be calculated as in Equation 9 presented below:

$$L = \prod_{m=1}^{d} \int_{\eta_m} \text{Beta}(\eta_m \mid \beta) \cdot \quad \text{Equation 9}$$
$$\left( \prod_{u \in U} \int_{\theta_u} Dir(\theta_u \mid \alpha) \prod_{(o_i \prec_u o_j) \in C_u} Pr_u(o_i \prec_u o_j) d\theta_u \right)$$
$$d\eta_m$$

Calculating Multi-Ranking Data for Maximizing Likelihood Function

When the likelihood function is calculated in step S120 as in Equation 7, the posterior multi-ranking data for maximizing the likelihood function is calculated in step S130. That is, the evaluation criterion preference probability distribution ($\theta_{u,m}$), the item score ($\pi_i(m)$), and the response accuracy probability distribution ($\eta_m$) for maximizing the likelihood function are calculated.

This process may use a well-known method known as the expectation maximization (EM) algorithm. The EM algorithm is disclosed in, for example, a paper by A. P. Dempster, N. M. Laird, and D. B. Rubin titled "Maximum likelihood from incomplete data via the EM algorithm" (Journal of Royal Statist, Soc., 39:1-38, 1977), and refers to a method of performing E-step and M-step repeatedly and calculating, as a solution, a probability distribution value when a likelihood value does not increase anymore and converges. Since the EM algorithm does not ensure that an optimal value is always found, it is preferable to conduct the EM algorithm many times and to adopt probability distribution when the greatest likelihood value is obtained as the best solution.

When the EM algorithm is applied to the embodiment of the present invention, a score difference ($\pi_j(m)-\pi_i(m)$) between the two items ($o_i$, $o_j$) is used as a factor of an exponential function in the equation of the probability ($Pr_u$) (that is, Equation 8). Therefore, the score of each item ($\pi_i(m)$) may not be directly known and only the difference between score values ($\pi_j(m)-\pi_i(m)$) may be known in the EM algorithm. The posterior evaluation criterion preference probability distribution ($\theta_{u,m}$), the posterior response accuracy probability distribution ($\eta_m$), and the score difference between the items ($\pi_j(m)-\pi_i(m)$) may be derived by the EM algorithm, and thereafter, the score of each item ($\pi_i(m)$) may be calculated by using a least square method (LSM).

As described above, the posterior multi-ranking data may be obtained by performing steps S110 to S130. In particular, since the item score ($\pi_i(m)$) is obtained as one of the posterior multi-ranking data, the item score may be utilized to provide the ranking of each item according to each evaluation criterion to the user, or recommend the high ranking items to the user. In addition, the evaluation criterion preference probability distribution ($\theta_{u,m}$) may be obtained as one of the posterior multi-ranking data, and preference of each user regarding the plurality of evaluation criteria may be estimated based on this data and the preference may be utilized.

Results of Experiment

FIGS. 7 to 10 are views to illustrate the results of an experiment of a multi-ranking estimation method according to one embodiment.

An experiment according to one embodiment was conducted with respect to two types of data, synthetic data and real-life data. A response accuracy probability distribution ($\eta_m$) and an evaluation criterion preference probability distribution ($\theta_{u,m}$) were generated by performing the probability model of the present invention described above with respect to the synthetic data. A certain number from among real numbers between 1 and 10 was selected as a score of each item according to each evaluation criterion ($\pi_i(m)$), and a pairwise comparison result was also generated by using a generation model.

MovieLens-100k data which indicates a collection of ratings given to movies by people was used as the real-life data. Pairs of all movies given ratings were generated. If ratings of two movies given by a person were different, a pairwise comparison result indicating that a movie having a higher rating has a higher priority than a movie that does not was generated by reflecting the ratings of the movies.

A Kendall's rank correlation coefficient (Kendall's tau) was used as a criterion for evaluating the results of the experiment. This value may have a value between −1 and 1. As the value is closer to 1, the real ranking order is well reflected, and as the value is closer to −1, the real ranking order is reflected in reverse. Since various evaluation criteria (m) were used in this experiment, two types of graphs, a graph ("maxmax") of an evaluation criterion having the highest Kendall's tau value and a graph ("avgmax") of averages of Kendall's tau values of all evaluation criteria, are displayed as shown in FIGS. 7 and 8.

First, Kendall's tau values according to estimated evaluation criteria are calculated regarding real evaluation criteria. For example, when there are actually three real evaluation criteria (that is, 3-dimensional) but it is assumed that only two evaluation criteria exist, two Kendall's tau values are calculated according to each real evaluation criterion.

Thereafter, the highest value from among the Kendall's tau values calculated according to each real evaluation criterion is regarded as its own Kendall's tau value. Maxmax indicates the maximum value of the Kendall's tau values calculated according to each of the estimated evaluation criteria, and avgmax indicates an average value. To compare with a related-art method, CrowdBT which is an algorithm suggested in the paper by Xi Chen, Paul Bennet, Kevyn Collins-Thompson, Eric Hovitz, titled "Pairwise Ranking Aggregation in a Crowdsourced Setting (WSDM, 2013) was implemented. The results of an experiment conducted by changing the number of items, the number of evaluation criteria of ranking scores, and the number of pairwise comparison results are shown in FIGS. 7 and 8.

Figure 8:
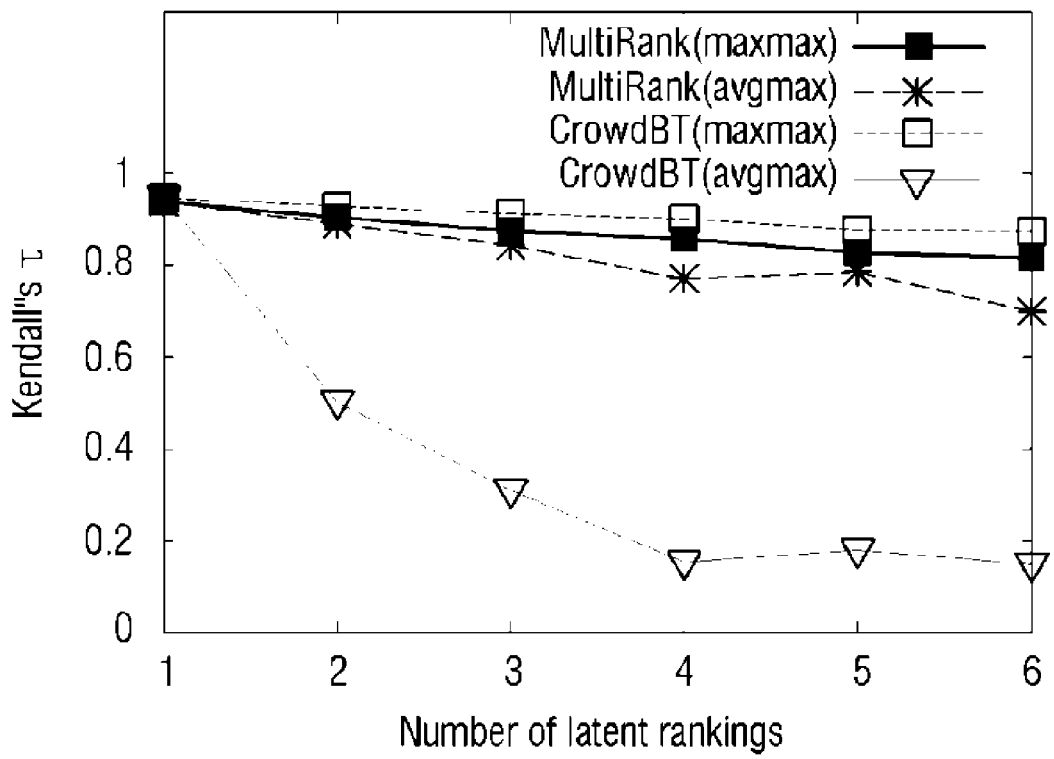

FIG. 7 shows Kendall's tau values regarding the result of estimating evaluation criteria according to the number of items, and FIG. 8 shows Kendall's tau values regarding the result of estimating evaluation criteria according to the number of evaluation criteria.

As shown in FIGS. 7 and 8, values of maxmax of the method (MultiRank) according to the present invention are lower than those of the related-art method (CrowdBT). However, since CrowdBT estimates when there is a single evaluation criterion, the other evaluation criteria are processed as a noise and avgmax values of CrowdBT may have very low values. That is, the relate-art method estimates a ranking score well in single ranking, but may not solve the multi-ranking problem. On the other hand, according to the method of the present invention, all of the maxmax values and the avgmax values are similarly high and thus it can be seen that a potential evaluation criterion is well estimated in comparison to the related-art method.

Figure 9:
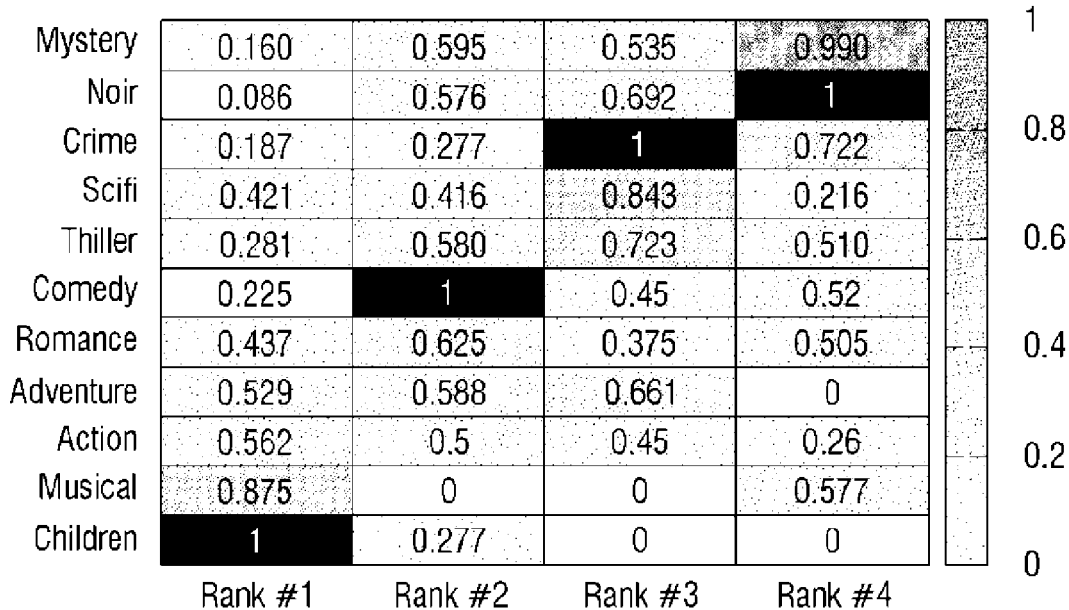
Figures 10, 11:
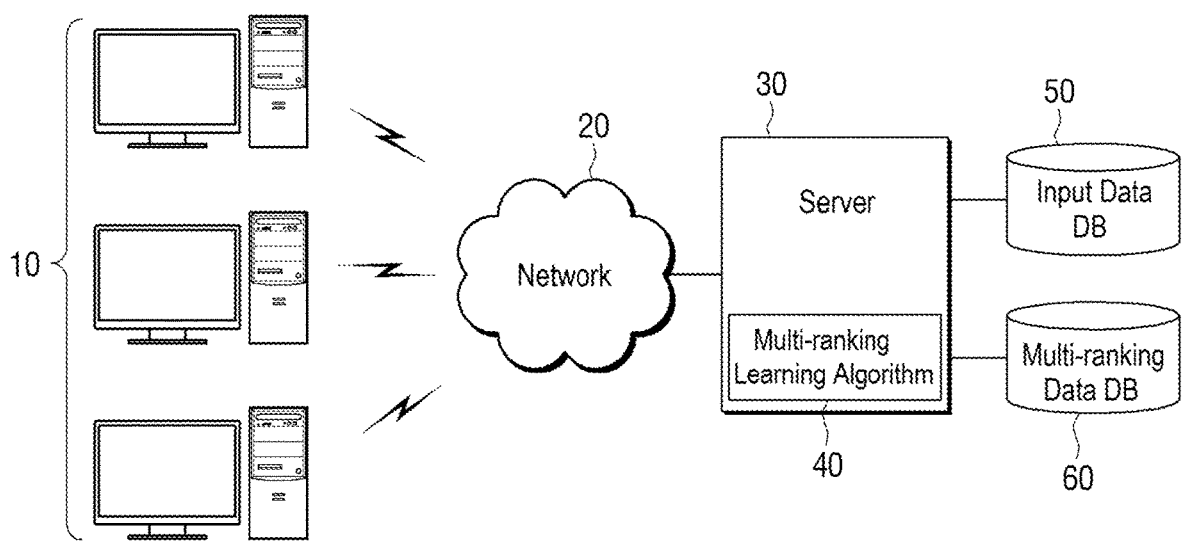
FIG. 11 is a block diagram to illustrate a configuration of an exemplary device implementing a multi-ranking estimation method according to one embodiment.

FIGS. 9 and 10 show a method for deriving a meaning of a potential estimation criterion by using a derived item ranking score according to one embodiment of the present invention.

First, movie rating data of the MovieLens-100k is inputted to the multi-ranking algorithm according to an embodiment of the present invention and ranking scores of all movies are calculated. Pairwise comparison data is generated by extracting pairs of all movies given ratings by people, and is inputted to the algorithm. It is assumed that there are four evaluation criteria and scores are set to be extracted according to the four evaluation criteria. In this case, it is not known whether there are really four evaluation criteria and the number of evaluation criteria (d) is arbitrarily set to 4.

Thereafter, high-ranking 60 movies are selected in the ranking order according to the four evaluation criteria, and the number of movies belonging to predetermined 11 genres (mystery, noir, crime, or the like) is inputted according to each evaluation criteria (expressed by "Rank #1" to "Rank #4" on the drawing). The result of normalizing the number of movies to values between 0 and 1 is shown in the table of FIG. 9. According to the table of FIG. 9, the number of children movies is the highest from among the high-ranking 60 movies according to a certain first evaluation criterion (Rank #1) and musical movies, action movies, adventure movies, and so on come next. From among the high-ranking 60 movies according to a certain second evaluation criterion (Rank #2), the number of movies is high in order of comedy, romances, and mystery genres and there is no musical movie in the rankings.

Accordingly, a meaning of each evaluation criterion may be analyzed based on this table as shown in FIG. 10. For example, since the number of movies belonging to children, musical, action, and adventure genres is the highest according to the first evaluation criterion (Rank #1) of FIG. 10, the first evaluation criterion (Rank #1) may be estimated to indicate whether movies are appropriate for family (or a criterion of a similar meaning). That is, it means that many respondents rate movies by considering whether movies are appropriate for family as a main evaluation criterion.

In addition, according to a fourth evaluation criterion (Rank #4) of FIG. 10, the number of movies belonging to mystery, noir, and crime genres is the highest. Therefore, the fourth evaluation criterion (Rank #4) may be estimated to indicate whether movies are appropriate for adults (or a criterion of a similar meaning). That is, it can be seen that many other respondents rate movies by considering whether movies are for adults as another main evaluation criterion.

According to embodiments of the present invention as described above, ranking scores may be extracted according to a plurality of evaluation criteria using a pairwise comparison result, and also, it may be determined what each of the plurality of evaluation criteria means by analyzing the items according to the ranking scores extracted according to each evaluation criterion.

FIG. 11 is a block diagram to illustrate a configuration of an exemplary device implementing a multi-ranking estimation method according to one embodiment.

Referring to FIG. 11, the device implementing the multi-ranking estimation method according to one embodiment may include a server 30, an input data DB 50, and a multi-ranking data DB 60, and may be connected with a plurality of user terminals 10 to communicate therewith via a network 20.

The user terminal 10 may be, for example, a portable mobile terminal such as a smart phone, a tablet PC, a notebook computer, or the like, or a non-portable terminal such as a desktop computer.

The network 20 is a wire and/or wireless network of a certain form which provides a transmission and reception path between the portable terminal 10 and the server 30, and may include one of a LAN, a WAN, Internet, and/or a mobile communication network.

The server 30 may be a service server which provides multi-ranking data extracted by the multi-ranking estimation method to the user terminal 10, and according to one embodiment, the server 30 may include a multi-ranking learning algorithm 40 for performing the above-described multi-ranking estimation method in the form of an application (software). To achieve this, the server 30 may include a processor, a memory, a storage, a communication unit, or the like, and the multi-ranking learning algorithm 40 may be stored in the storage and may be loaded into the memory and executed under the control of the processor.

In the illustrated embodiment, the server 30 may be connected with the input data DB 50 and the multi-ranking data DB 60 to communicate therewith. In an alternative embodiment, the server 30 may include at least one of the input data DB 50 and the multi-ranking data DB 60. The input data DB 50 may store input data necessary for generating the multi-ranking data DB (for example, a collection of a plurality of respondents, a collection of a plurality of items, and a collection of a plurality of pairwise comparison data regarding the plurality of items as described above), and the multi-ranking data DB 60 may store prior multi-ranking data before being inputted to the learning algorithm 40 and/or posterior multi-ranking data generated after the learning algorithm 40 is performed.

While the invention has been shown and described with reference to certain preferred embodiments thereof and the drawings, the present invention is not limited by the above-described embodiments. It will be understood by those skilled in the art that various changes in form and details may be made therein without departing from the spirit and scope of the invention as defined by the appended claims. Therefore, the scope of the invention is defined not by the detailed description of the invention but by the appended claims and equivalents thereto.

What is claimed is:

1. A method for estimating multi-ranking using pairwise comparison data, the method comprising:
    inputting information on pairwise comparison data as input data; and
    generating multi-ranking data based on the input data,
    wherein the input data comprises an array representing a collection of a plurality of respondents, a collection of a plurality of items, and a collection of a plurality of pairwise comparison data regarding the plurality of items,
    wherein each of the plurality of pairwise comparison data is data indicating a preference between two items determined according to one of a plurality of evaluation criteria,
    wherein the multi-ranking data comprises:
        an evaluation criterion preference probability distribution ($\theta u,m$) which is a probability distribution of a probability that a respondent selects a certain evaluation criterion;
        an item score ($\pi i(m)$) which is a score given to each item according to each evaluation criterion; and
        a response accuracy probability distribution (nm) which is a probability distribution of a probability that a respondent accurately responds according to each evaluation criterion,
    wherein generating the multi-ranking data comprises calculating a probability (Pr) of a pairwise comparison result regarding two certain items (oi, oj) based on the input data and first multi-ranking data, and
    wherein, regarding each evaluation criterion, the probability (Pr) of the pairwise comparison result is in proportion to a sum of:
        a product of (nm) and a probability of a comparison result indicating that the first item (oi) is preferred to the second item (oj) when the respondent correctly responds; and
        a product of (1-ηm) and a probability of a comparison result indicating that the second item (oi) is preferred to the first item (oi) when the respondent incorrectly responds.

2. The method of claim 1, wherein generating the multi-ranking data comprises:
    calculating a likelihood function based on the calculated probability (Pr); and
    calculating second multi-ranking data for maximizing the likelihood function.

3. The method of claim 2, wherein the first multi-ranking data comprises a prior evaluation criterion preference probability distribution, a prior item score, and a prior response accuracy probability distribution, and
    wherein the second multi-ranking data comprises a posterior evaluation criterion preference probability distribution, a posterior item score, and a posterior response accuracy probability distribution.

4. The method of claim 1, wherein the probability of the result of the comparison indicating that that the first item ($o_i$) is preferred to the second item ($o_j$) and the probability of the result of the comparison indicating that the second item ($o_j$) is preferred to the first item ($o_i$) follow a Bradley-Terry model.

5. The method of claim 3, wherein the prior evaluation criterion preference probability distribution follows a Dirichlet distribution, and the prior response accuracy probability distribution follows a beta distribution.

6. The method of claim 3, wherein calculating the second multi-ranking data for maximizing the likelihood function comprises calculating the second multi-ranking data using an Expectation Maximization (EM) algorithm.

7. The method of claim 3, wherein calculating the second multi-ranking data for maximizing the likelihood function comprises calculating the second multi-ranking data using an Expectation Maximization (EM) algorithm and a Least Square Method (LSM) algorithm.

8. The method of claim 7, wherein calculating the second multi-ranking data for maximizing the likelihood function comprises:
    calculating the posterior evaluation criterion preference probability distribution, the posterior response accuracy probability distribution, and a score difference between posterior items scores of the first item ($o_i$) and the second item ($o_j$) according to the EM algorithm; and
    calculating a posterior score of each item according to the LSM algorithm.

9. A non-transitory computer readable recording medium which has a program recorded thereon, for executing the method according to claim 1 in a computer.

* * * * *